Figures 1, 2:
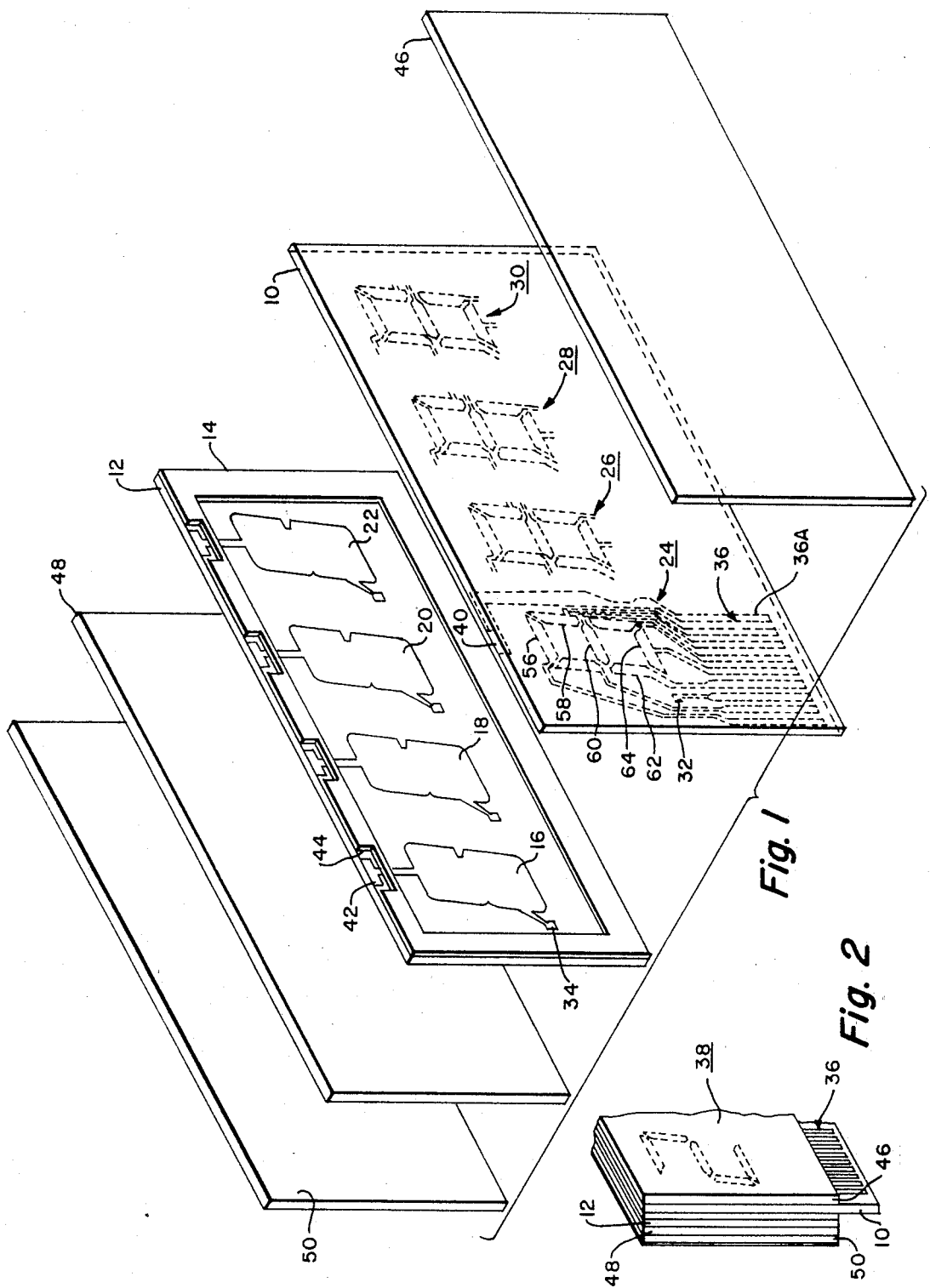

United States Patent
Fergason

[11] 3,853,392
[45] Dec. 10, 1974

[54] GASKET FOR LIQUID CRYSTAL LIGHT SHUTTERS

[75] Inventor: James L. Fergason, Kent, Ohio

[73] Assignee: Hoffman-La Roche Inc., Nutley, N.J.

[22] Filed: Sept. 13, 1973

[21] Appl. No.: 396,789

[52] U.S. Cl. .......................................... 350/160 LC
[51] Int. Cl. .............................................. G02f 1/16
[58] Field of Search....................... 350/160 LC, 150

[56] References Cited
UNITED STATES PATENTS

| | | | |
|---|---|---|---|
| 3,661,444 | 5/1972 | Matthies | 350/160 LC |
| 3,671,231 | 6/1972 | Haas et al. | 350/160 LC UX |
| 3,702,723 | 11/1972 | Borden, Jr. | 350/160 LC |
| 3,771,855 | 11/1973 | Burns | 350/160 LC |

Primary Examiner—Edward S. Bauer
Attorney, Agent, or Firm—Brown, Murray, Flick & Peckham

[57] ABSTRACT

A gasket for a field effect light shutter comprising an insulating material, preferably a thermoplastic resin, incorporating a material which conducts electricity whereby the capacitive storage time of the field effect liquid crystal light shutter is decreased with an attendant improvement in the response time of the shutter. The material which conducts electricity is preferably powdered carbon, a semiconducting material, or some other material, not an insulator, with a resistivity less than $10^6$ ohm-centimeters.

8 Claims, 2 Drawing Figures

3,853,392

GASKET FOR LIQUID CRYSTAL LIGHT SHUTTERS

BACKGROUND OF THE INVENTION

While not limited thereto, the present invention is particularly adapted for use in field effect liquid crystal light shutter displays such as those shown in U.S. Pat. No. 3,731,986, issued May 8, 1973. Light shutters of this type comprise a layer of nematic liquid crystal material sandwiched between a pair of parallel transparent plates, the plates being coated on selected areas thereof with transparent conducting material to form an alpha-numeric display. The surfaces of the plates in contact with the liquid crystal material are rubbed at right angles to each other to effect a twisted nematic structure. Application of an electrical potential between the transparent conducting coatings will cause the nematic structure to rotate or untwist. By providing polarizers on opposite sides of the display, polarized light can be made to pass through the structure or be blocked, depending upon whether the polarizers are crossed or parallel to each other.

One disadvantage of field effect alpha-numeric displays utilizing liquid crystals is their relatively slow response time occasioned by the fact that the liquid crystal layer between transparent electrodes form a capacitor. Consequently, when a potential is applied across the transparent electrodes and then removed, the electric field between the electrodes does not immediately disappear but persists for a period of time dependent upon the resistivity of the liquid crystal material between the electrodes. Resistivities of liquid crystal layers on the order of $10^{12}$ to $10^{13}$ ohm-centimeters are common, meaning that the capacitive storage time after removal of an applied voltage is relatively long. This means that in an alpha-numeric display, for example, the numerals or letters persist for a short interval after removal of an applied voltage between the electrodes, resulting in a reduced response time during turn-off.

SUMMARY OF THE INVENTION

In accordance with the present invention, a field effect light shutter is provided in which the response time is considerably improved. Specifically, there is provided in accordance with the invention a layer of liquid crystal material sandwiched between transparent parallel plates. Formed on the plates are films of conductive material in contact with the liquid crystal material. A gasket surrounds the layer of liquid crystal material to confine it between the plates, the gasket material being in contact with transparent conductive leads connected to the films of conductive material and comprising an insulator containing in powdered form a material which will reduce the effective resistance of the liquid crystal layer between the films to decrease the capacitive storage time of the light shutter.

The gasket is preferably formed from a thermoplastic resin such as that described in copending application Ser. No. 396,788, filed concurrently herewith. The material in powdered form preferably comprises graphite, a semiconductive material, or any other material having a resistivity less than $10^6$ ohm-centimeters and above about $10^3$ ohm-centimeters, meaning that it is not an insulator. The material, depending upon its resistivity, can be added to the gasket material in amounts ranging up to about 25 percent of the total weight of the gasket material.

The above and other objects and features of the invention will become apparent from the following detailed description taken in connection with the accompanying drawings which form a part of this specification, and in which:

FIG. 1 is an exploded view of the liquid crystal cell of the invention showing the gasket of the present invention used therein; and FIG. 2 is an end view of the assembled liquid crystal cell of FIG. 1.

With reference now to the drawings, and particularly to FIG. 1, the liquid crystal cell shown is of the field effect light shutter type described in the aforesaid U.S. Pat. No. 3,731,986. It comprises a pair of transparent plates 10 and 12 separated by means of a gasket 14 which forms the subject matter of the present application. The gasket 14 spaces the plates in an amount equal to about 0.0005 inch; and in the space between the plates 10 and 12 and within the enclosure formed by the gasket 14 is a layer of liquid crystal material. For purposes of the present invention, it will be assumed that the liquid crystal material is of the nematic type having a positive dielectric anisotropy as taught in U.S. Pat. No. 3,731,986.

As shown in FIG. 1, the opposing surfaces of the transparent plates 10 and 12 have formed thereon patterns of transparent conducting material such as tin oxide or indium oxide. The plate 12 is provided with four patches of transparent conducting material 16, 18, 20 and 22; while the other transparent plate 10 is provided with four sets of mutually insulated strips of transparent conducting material, the four sets being identified generally by the reference numerals 24, 26, 28 and 30. When the plates 10 and 12 are bonded to opposite sides of the gasket 14, the transparent conductive patches 16–22 will be aligned with the sets of strips 24–30 on the plate 10. A dot or decimal point 32 for each of the sets of strips on plate 10 is aligned with a corresponding dot 34 on the plate 12.

The operation of the liquid crystal cell will be described hereinafter; however, it will be appreciated that when all of the strips of the set 24, for example, are opaque while the surrounding areas transmit light, the resulting configuration will represent the numeral "8." Similarly, by causing selected ones of the strips in set 24 to become opaque, any numeral from 1 through 0 can be made to appear.

The various mutually insulated conductive strips in the sets 24–30 are adapted to be connected through a plurality of mutually insulated strips of transparent conducting material 36 to external leads, not shown. In this respect, it can be seen from FIG. 2 that the lower end of the plate 10 with the strips 36 thereon extends beneath the remainder of the liquid crystal cell, generally designated by the reference numeral 38, in order that a suitable electrical connector can be slipped over the lower portion of the plate 10 to connect the conducting strips 36 to external electrical circuitry. Note that the strip 36A extends from the bottom of the plate 10 all the way to the top thereof where it terminates in a horizontal portion 40 which is directly opposite a corresponding horizontal portion 42 connected to the patch 16 of electrically conducting material on plate 12. An electrically conductive epoxy material or the like is placed in opening 44 in the gasket 14 so as to interconnect the portions 40 and 42. With this arrangement, one terminal of a potential source can be connected to the strip 36A and, hence, to the conductive patch on one side of the liquid crystal material; while selected ones of the remaining strips 36 can be connected to the other terminal of the same potential source, thereby establishing a potential gradient resulting in an electric field across the liquid crystal material in selected areas, depending upon which ones of the strips 36 are energized (i.e., connected to the other terminal of the potential source).

In the manufacture of the liquid crystal unit, the layers of transparent conducting material which are in contact with the nematic-phase liquid crystal material must be prepared by being stroked or rubbed unidirectionally with a cotton cloth, for example. Furthermore, the transparent conducting material on plate 10 must be rubbed unidirectionally at right angles to the direction of rubbing of the transparent conductive material on plate 12. The effect of this is to produce a twisted nematic structure in the intervening liquid crystal material as is more fully explained in the aforesaid U.S. Pat. No. 3,731,986. In contact with the plate 10 is a first polarizing plate 46, and on the backside of the plate 12 is a second polarizing plate 48. The planes of polarization of the two plates 46 and 48 are at right angles to each other, the plane of polarization of the plate 46 being parallel to the direction of rubbing of the transparent conductive material on plate 10 and the plane of polarization of plate 48 being parallel to the direction of rubbing on plate 12. Finally, behind the second polarizer 48 is a reflector 50, which is the subject of copending application Ser. No. 364,027, filed May 25, 1973. In essence, it is a reflector which will scatter polarized light without depolarizing the same such that the display can be viewed with ambient light passing into the liquid crystal film from the front and then scattered from reflector 50.

In the operation of the device, ambient light impinging on the forward face of the plate 46 will pass through the plate as light polarized in the direction of rubbing the lines on the transparent conductive material of plate 10. This polarized light, as it passes through the layer of liquid crystal material between the plates 10 and 12, will be rotated through 90°; and this 90° rotation will occur throughout the entire surface area of the layer of liquid crystal material, assuming that an electrical potential is not applied between the electrically conductive coatings on the plates 10 and 12. The plane of polarization of polarizer 48 is at 90° with respect to that of polarizer 46. Hence, with no electrical potential applied between the electrically conductive films on plates 10 and 12, the polarized light will pass through the entirety of the liquid crystal cell, will be scattered from the reflector 50, and will again pass through polarizer 48, the liquid crystal cell and polarizer 46. Under these circumstances, the entire display will appear white.

Now, if an electrical potential, on the order of 5 volts or greater, is applied between the conducting films on the plates 10 and 12, the liquid crystal unit will no longer rotate the plane of polarization through 90° in the areas of the energized strips on plate 10. Hence, under these circumstances, polarizer 48 will block the light in the areas across which an electrical potential exists and energizing appear dark on a white background. In FIG. 2, the numeral "2" is shown; and this can be achieved by applying a potential of one polarity to the conducting strip 36A whereby the patch 16 of electrically conductive material on plate 12 has a potential of one polarity applied thereto while applying a potential of the opposite polarity to the conductors connected to strips 56–64 of the set 24. Similarly, other numerals can be made to appear by selectively energizing ones of the strips in each of the sets 26–30 while at the same time enertizing the conductive patches 16–22 on the opposite sides of the liquid crystal layer.

Instead of having crossed-polarizers as in the embodiment of the invention just described, it is also possible to have parallel polarizers, in which case the light will be blocked in the absence of an electrical potential applied across the liquid crystal layer. When a potential is applied, white numerals on a black background can be made to appear.

The resistivity of the liquid crystal layer between plates 10 and 12 is ordinarily in the range of about $10^{12}$ to $10^{13}$ ohm-centimeters. As the resistivity of the liquid crystal material increases so also does the life of the crystal; but this increases the capacitive storage time as was explained above. This results in a reduced response time of the display during turn-off, the letters or numerals persisting for a short interval after removal of an applied field between the electrodes.

In accordance with the present invention, a material having a resistivity of less than $10^6$ ohm-centimeters is added to the material of the gasket 14 in order to reduce the effective resistivity of the liquid crystal layer. Note that the gasket 14 is in contact with the conductive strips 36 connected to the strips of the sets 24–30. It is also connected to the patches 16–22 on plate 12. Consequently, by incorporating a slightly conductive material into the gasket 14, the effective resistivity across the liquid crystal layer can be reduced. As was mentioned above, the gasket 14 is preferably formed from a thermoplastic resin such as that described in copending application Ser. No. 396,788, filed concurrently herewith. However, it can comprise any insulator which will, at the same time, be capable of incorporating a substance in powdered form having a resistivity at least lower than $10^6$ ohm-centimeters and above about $10^3$ ohm-centimeters. Beneath $10^3$ ohm-centimeters the distribution of the particles, at least some of which will be spaced from each other, will be such as to give unpredictable varying results. Above $10^6$ ohm-centimeters, the weight percent of the powdered material necessary to produce the desired results becomes too great (e.g., above 50 percent) and approaches the point where the additive impairs the adhesive qualities of the thermoplastic material. Satisfactory results have been obtained, for example, by incorporating carbon black homogeneously into the gasket 14, in which case the carbon black is added in an amount up to about 1 percent by weight of the total weight of the gasket. Semiconductive materials such as doped zinc oxide and doped lead oxide can be added up to 20 percent by weight of the total weight of the gasket. Alternatively, lead sulfate can be added in the range of about 30 percent to 50 percent by weight. Other materials which can be used include lead nitrate, arsenic triselenide, selenium and arsenic trisulfide. When a material of this type is incorporated into the gasket, the effective resistivity of the liquid crystal cell is reduced from $10^{12}$ to $10^{13}$ ohm-centimeters to $10^8$ to $10^{10}$ ohm-centimeters. Hence, by reducing the effective resistance of the liquid crystal cell in this way, its response time is materially increased; however, at the same time, the life of the liquid crystal cell is not materially decreased.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a field effect liquid crystal light shutter, the combination of a layer of liquid crystal material sandwiched between transparent parallel plates, films of transparent conductive material on the plates and in contact with the liquid crystal material, means for applying a potential between said films of transparent material to thereby effect a light shutter action, a gasket surrounding said layer of liquid crystal material to confine it between said plates, said gasket being in contact with said films of conductive material and being formed from an insulator containing a material which will reduce the effective resistance of the liquid crystal layer between the films to decrease the capacitive storage time of said light shutter.

2. The light shutter of claim 1 wherein said insulating material from which the gasket is formed comprises a thermoplastic resin.

3. The light shutter of claim 1 wherein said material which reduces the effective resistance comprises a semiconductive material in powdered form.

4. The light shutter of claim 3 wherein said powdered material is selected from the group consisting of doped zinc oxide and doped lead oxide.

5. The light shutter of claim 3 wherein said semiconductive material has a resistivity of about $10^6$ ohm-centimeters and comprises up to about 50 percent by weight of the total weight of said gasket.

6. The light shutter of claim 1 wherein said material which will reduce the effective resistance has a resistivity in the range of about $10^3$ to $10^6$ ohm-centimeters.

7. The light shutter of claim 1 wherein said material which reduces the effective resistance comprises carbon black.

8. The light shutter of claim 7 wherein said carbon black comprises up to 1 percent by weight of the total weight of said gasket.

* * * * *